Patented July 15, 1924.

1,501,274

UNITED STATES PATENT OFFICE.

MOSES L. CROSSLEY, OF SOMERVILLE, NEW JERSEY, ASSIGNOR TO CALCO CHEMICAL COMPANY, OF BOUNDBROOK, NEW JERSEY, A CORPORATION OF NEW JERSEY.

6, 8-DIMETHYL-2-PHENYLQUINOLINE-4-CARBOXYLIC ACID AND PROCESS OF MAKING SAME.

No Drawing.   Application filed December 29, 1920.   Serial No. 433,959.

*To all whom it may concern:*

Be it known that I, MOSES L. CROSSLEY, a citizen of the United States, residing at Somerville, in the county of Somerset, State of New Jersey, have invented the new and useful 6, 8-Dimethyl-2-Phenylquinoline-4-Carboxylic Acid and Processes of Making Same, of which the following is a specification.

This invention relates to the production of 6, 8-dimethyl-2-phenylquinoline-4-carboxylic acid, and, also, to the novel process of making the same. The structural formula of the product or compound is as follows:

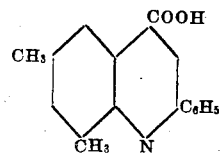

The preferred process of producing the new product consists in mixing substantially 106 parts by weight of benzaldehyde with about 800 parts by weight of 95% ethyl alcohol, and adding thereto, slowly and in small portions, approximately 121 parts of meta-4-xylidine. The resulting mixture is then heated and refluxed for about one and one-half hours, whereupon there is added to it, in the course of about 2 hours, substantially 88 parts by weight of pure pyruvic acid, and the refluxing continued for about one and one-half hours longer. The reaction mass is then cooled, and, thereafter, the crude product is filtered and dried. It is then purified, for example, by recrystallizing several times from benzene, $C_6H_6$.

The final product is a pale yellow, crystalline substance melting at about 231–232 C., and is soluble in ethyl alcohol, ether, benzene, and carbon tetrachloride. It forms salts with both acids and alkalies.

The novel product has pronounced therapeutic properties and is indicated in gout, articular rheumatism and kindred ailments.

Having thus fully described the invention, what I claim as new and desire to secure by Letters Patent is:

The herein described 6, 8-dimethyl-2-phenylquinoline-4-carboxylic acid, the same being soluble in ethyl alcohol, benzene, ether and carbon tetrachloride, and being capable of forming salts with acids and bases.

In testimony whereof, I have signed my name to this specification.

MOSES L. CROSSLEY.